United States Patent
Son

(10) Patent No.: US 6,490,504 B2
(45) Date of Patent: Dec. 3, 2002

(54) FEEDING ROBOT AND CONTROL METHOD THEREFOR

(75) Inventor: Tae-Kyu Son, Seongnam (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/822,364

(22) Filed: Apr. 2, 2001

(65) Prior Publication Data

US 2002/0107611 A1 Aug. 8, 2002

(30) Foreign Application Priority Data

Dec. 18, 2000 (KR) ............................................. 00-77929

(51) Int. Cl.⁷ ............................................. G05B 19/00
(52) U.S. Cl. .................... 700/245; 700/248; 700/249; 700/250; 700/258; 700/259; 700/260; 700/281; 700/262; 700/263; 700/264; 451/26; 701/23
(58) Field of Search ................... 700/245, 275, 700/248, 249, 250, 258, 259, 260–264; 271/259, 263, 265.01, 273, 21, 245, 243, 9.13, 267, 274, 902, 9.11; 347/108, 85; 358/300; 399/371, 391, 361; 355/50; 451/26; 701/23

(56) References Cited

U.S. PATENT DOCUMENTS

| | | | | |
|---|---|---|---|---|
| 3,622,238 A | * | 11/1971 | Alman, Jr. et al. ........... 355/50 |
| 4,186,919 A | * | 2/1980 | Miciukiewicz .............. 271/267 |
| 4,733,310 A | * | 3/1988 | Kapp et al. ................. 358/300 |
| 4,826,148 A | * | 5/1989 | Coons, Jr. ................... 271/245 |
| 5,328,168 A | * | 7/1994 | Fox ............................ 271/259 |
| 5,371,975 A | * | 12/1994 | Lundmark .................... 451/26 |
| 5,826,157 A | * | 10/1998 | Wierszewski ............... 399/396 |
| 6,167,439 A | * | 12/2000 | Levine et al. ............... 709/217 |
| 6,192,298 B1 | | 2/2001 | Nishikawa .................. 700/251 |
| 6,257,717 B1 | * | 7/2001 | Axtell et al. ................ 347/108 |

OTHER PUBLICATIONS

ACC Abstracts—Wednesday, Jun. 24, WA01–1—WP17–4.*
Michael, Fractal robot chemistry machine, 2001, Naono Thecnology Magazine, vol. 7, No. 2, pp. 1–20.*

* cited by examiner

Primary Examiner—William A. Cuchlinski, Jr.
Assistant Examiner—McDieunel Marc
(74) Attorney, Agent, or Firm—Staas & Halsey LLP

(57) ABSTRACT

A feeding robot which is capable of drawing a glass panel for a liquid crystal display from a cassette without bringing it into collision with the cassette, and then feeding the drawn glass panel with a reduced error, and a method for controlling the same. Determination is made as to whether an object to be fed has been accurately aligned with a traveling axis of the feeding robot. A turned angle of the object relative to the traveling axis is calculated if the object has not been accurately aligned with the traveling axis. The robot is turned by the turned angle and then draws the object. While the robot moves to a target position, a correction value for the target position is calculated, and the target position is then corrected by the calculated correction value. The feeding robot control method is capable of aligning the glass panel with a hand of the feeding robot using sensors in the robot. The feeding robot is able to draw the glass panel from the cassette safely without bringing it into collision with the cassette and to lay the drawn glass panel on an outlet stage with a high degree of positional precision.

11 Claims, 16 Drawing Sheets

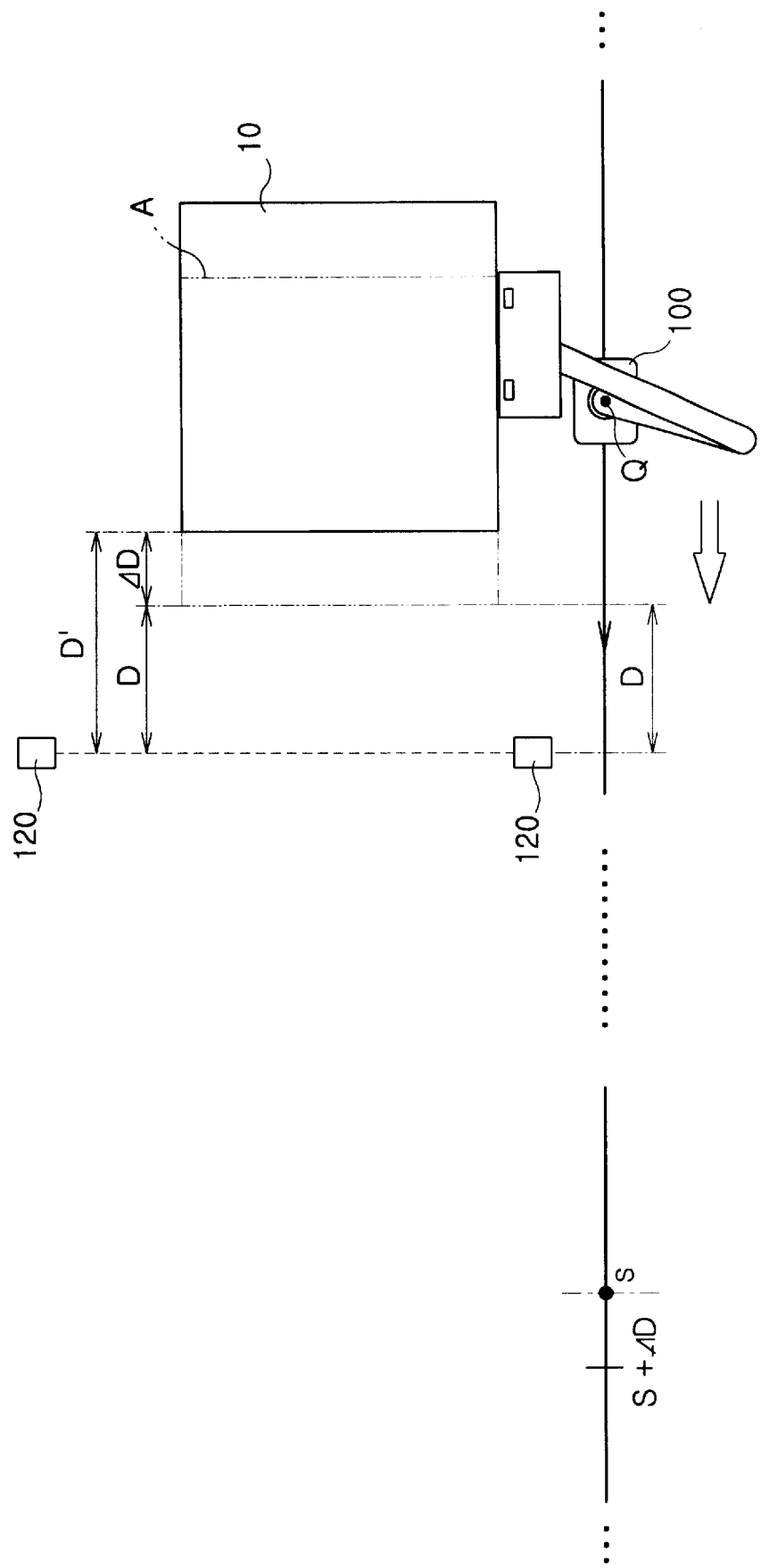

FEEDING ROBOT AND CONTROL METHOD THEREFOR

BACKGROUND OF THE INVENTION

1. Field of the Invention

The present invention relates in general to feeding robots, and more particularly to a feeding robot which is capable of drawing a glass panel for a liquid crystal display from a cassette without bringing it into collision with the cassette, and then feeding the drawn glass panel with a reduced error, and a method for controlling the same.

2. Description of the Prior Art

Liquid crystal displays (LCDs) are each generally manufactured with a number of transistors integrated on a glass panel, which is a main substrate of the LCD. The LCD glass panel normally remains loaded in a cassette, and is then automatically fed from the cassette to the next process by a feeding robot as needed.

A description will hereinafter be given of a typical operation of feeding the above LCD glass panel.

FIGS. 1a and 1b are plan views illustrating the operation of a conventional feeding robot.

With reference to FIGS. 1a and 1b, provided that an LCD glass panel 3, which is an object to be fed, remains loaded in a cassette 4 under the condition that it is turned at a certain angle relative to its correct position, it will be misaligned with a hand 2 of a feeding robot 1 accessing to feed it.

Accordingly, when the hand 2 of the feeding robot 1 moves to draw the LCD glass panel 3 from the cassette, a portion 5 of the glass panel 3 may be brought into collision with the cassette 4 and then get broken. This may in turn result in a loss in components, a delay in working process, a degradation in productivity, etc.

SUMMARY OF THE INVENTION

Therefore, the present invention has been made in view of the above problems, and it is an object of the present invention to provide a feeding robot which is capable of drawing a glass panel for a liquid crystal display from a cassette without bringing it into collision with the cassette, and then feeding the drawn glass panel with a reduced error, and a method for controlling the same.

In accordance with one aspect of the present invention, the above and other objects can be accomplished by the provision of a feeding robot having a body, a plurality of joints, a plurality of links, each for interconnecting corresponding ones of the joints, and a hand for holding an object to be fed, the robot comprising distance sensing means for measuring a distance between the hand and the object; traverse sensing means for sensing a movement of the feeding robot to a predetermined target position; and a controller for controlling the feeding robot on the basis of information sensed by the traverse sensing means and distance sensing means.

In accordance with another aspect of the present invention, there is provided a method for controlling a feeding robot, comprising the steps of a) determining whether an object to be fed has been accurately aligned with a traveling axis of the feeding robot; b) calculating a turned angle of the object relative to the traveling axis if the object has not been accurately aligned with the traveling axis; c) turning the robot by the turned angle and then drawing the object; d) moving the robot to a target position and calculating a correction value for the target position; and e) correcting the target position by the calculated correction value.

BRIEF DESCRIPTION OF THE DRAWINGS

The above and other objects, features and advantages of the present invention will be more clearly understood from the following detailed description taken in conjunction with the accompanying drawings, in which:

FIGS. 5a to 5e are plan views illustrating the operation of the feeding robot, based on the control method of FIG. 4;

DETAILED DESCRIPTION OF THE PREFERRED EMBODIMENTS

Figure 1A:
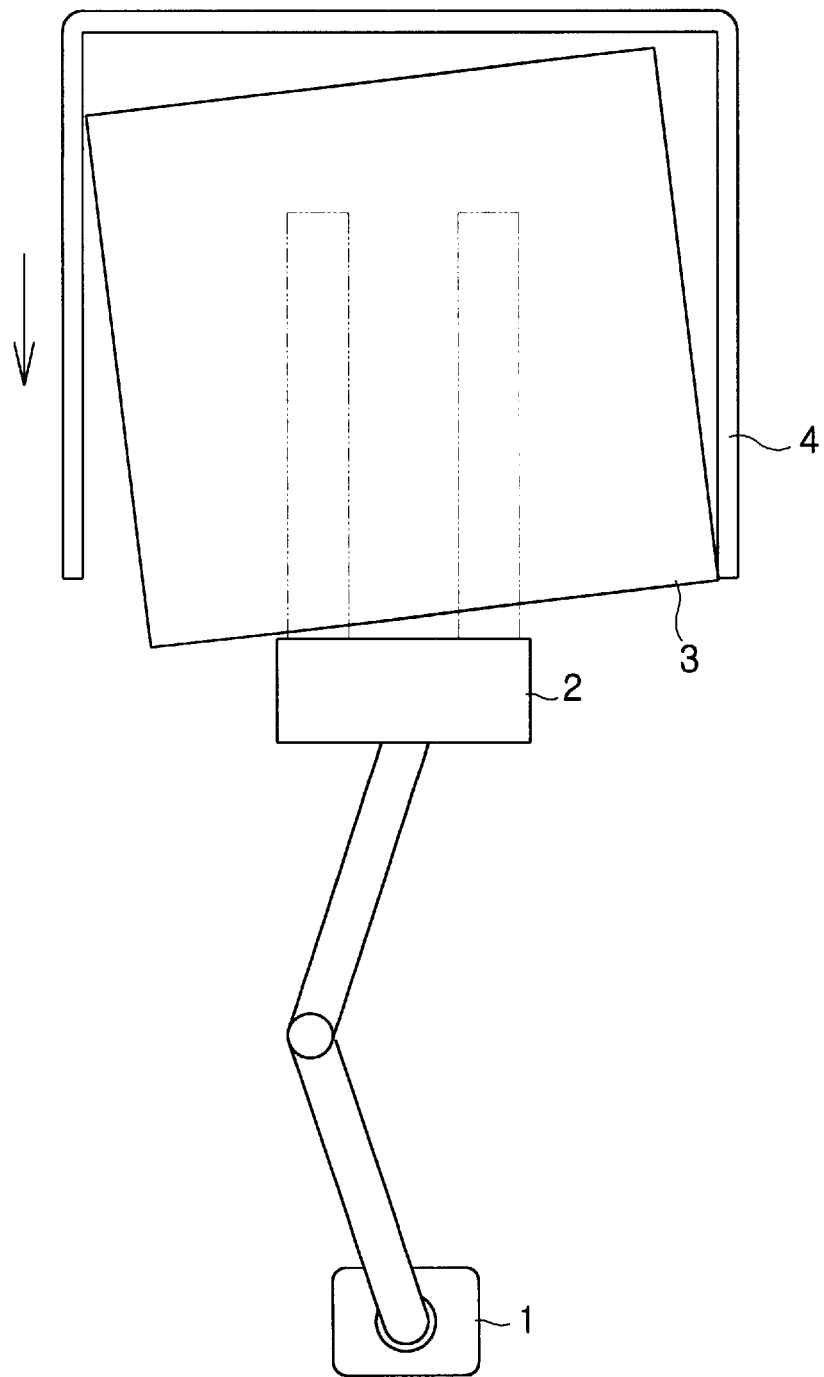
FIGS. 1a and 1b are plan views illustrating the operation of a conventional feeding robot.
Figure 1B:
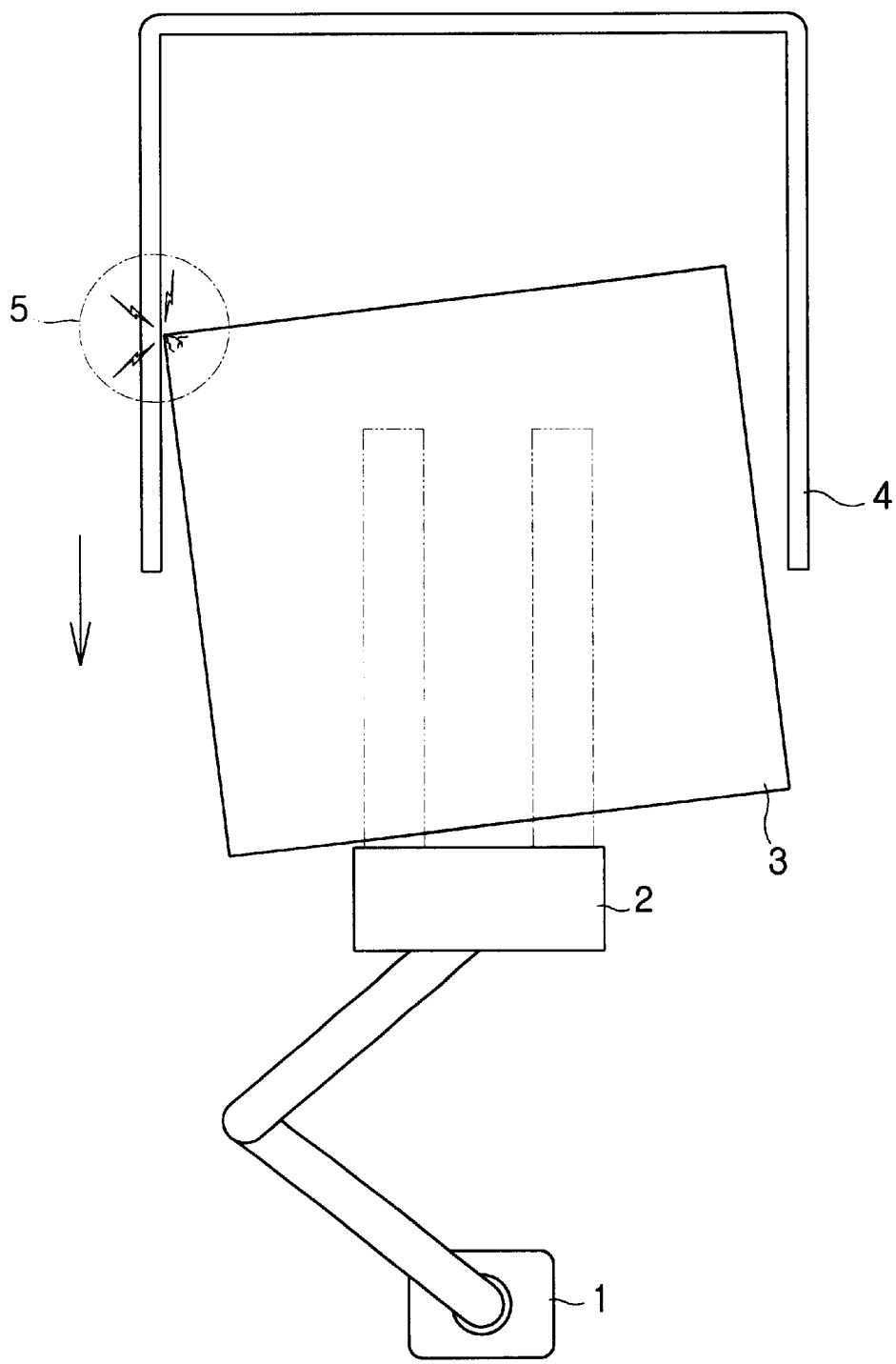
Figure 2:
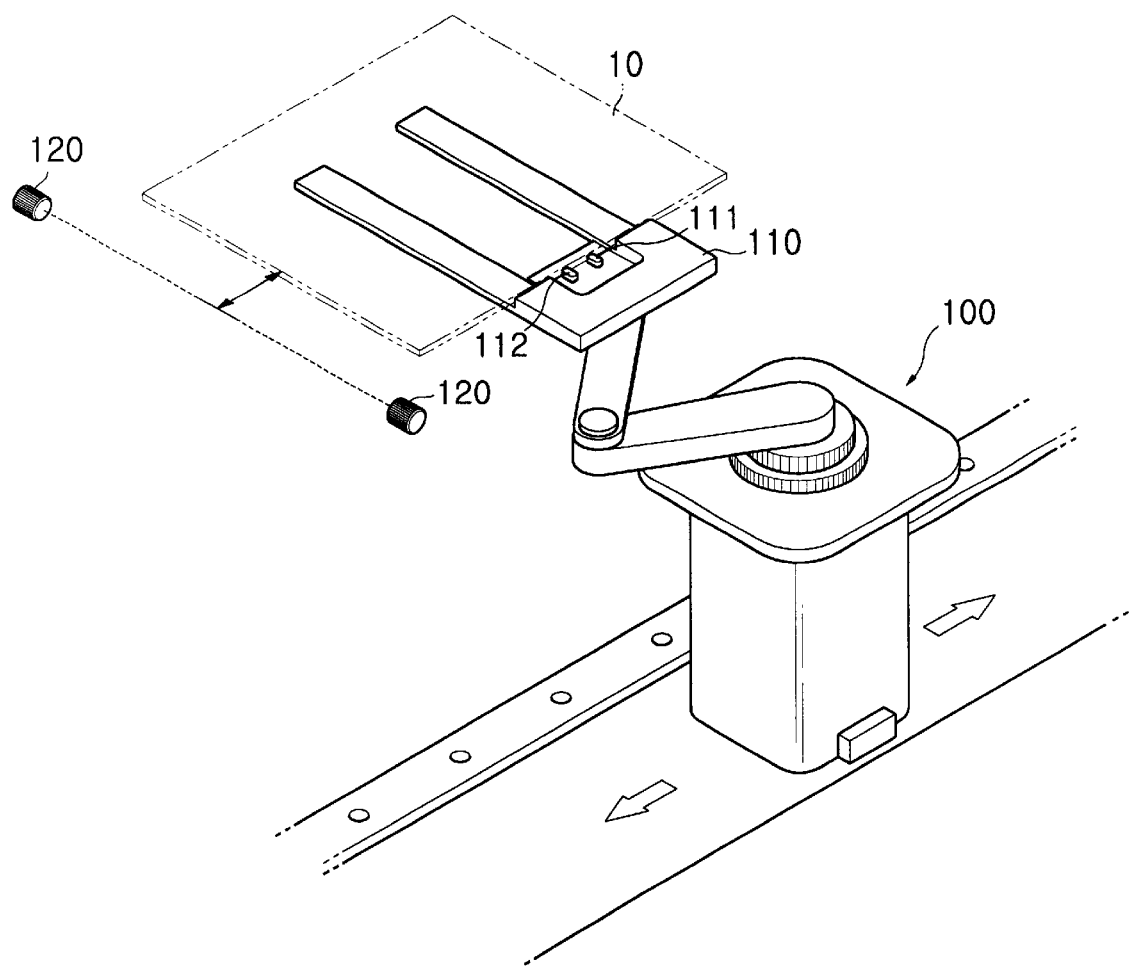
FIG. 2 is a perspective view of a feeding robot in accordance with the present invention.
Figure 3:
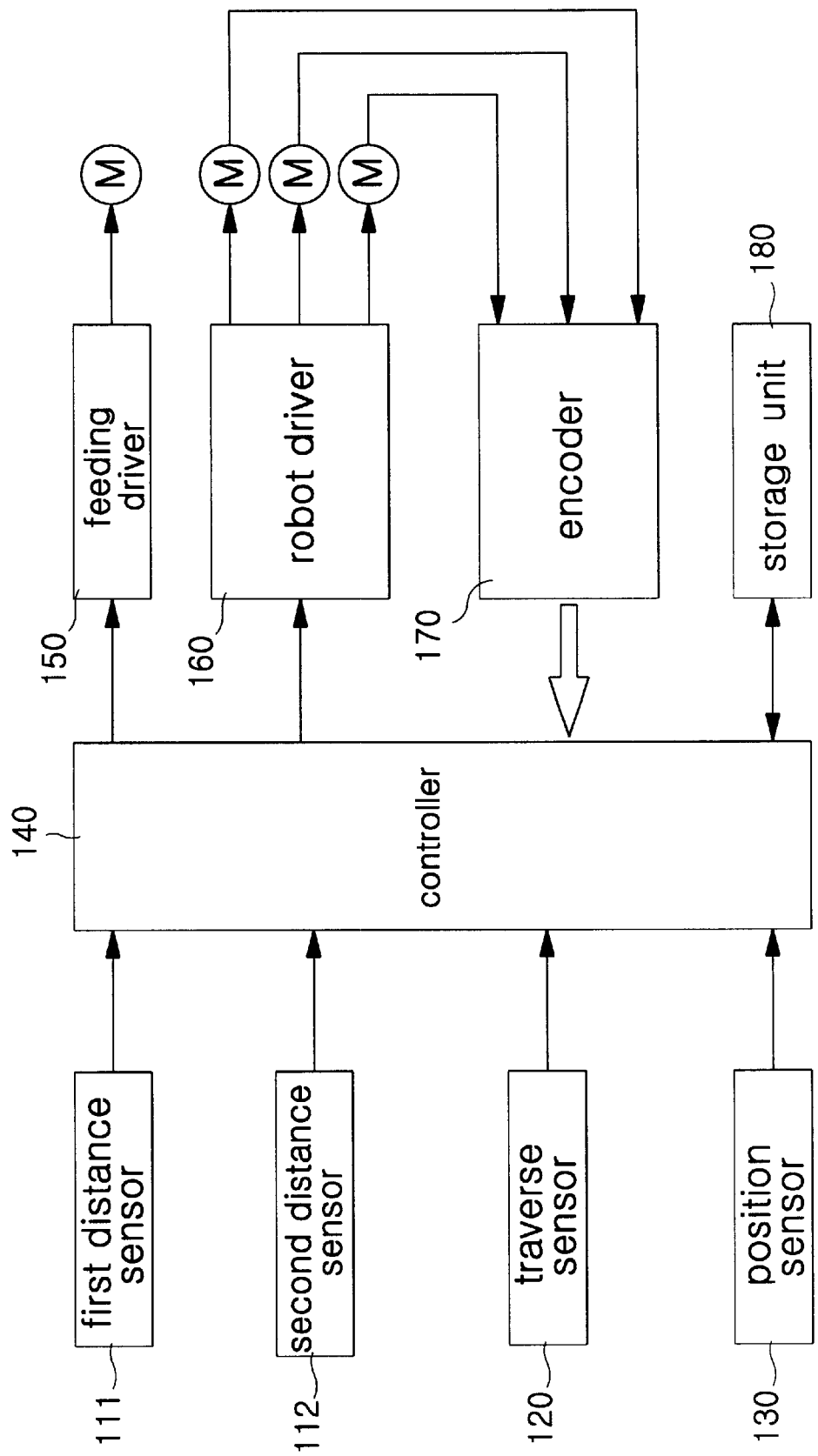
FIG. 3 is a block diagram showing the construction of the feeding robot in accordance with the present invention.

FIG. 2 is a perspective view of a feeding robot in accordance with the present invention and FIG. 3 is a block diagram showing the construction of the feeding robot in accordance with the present invention.

With reference to FIGS. 2 and 3, the feeding robot comprises a body 100 including a hand 110 actuated via a plurality of joints and links. Distance sensing means is provided on a portion of the hand 110 to measure a distance between the hand 110 and a glass panel 10. The distance sensing means preferably includes a first distance sensor 111 and a second distance sensor 112, which are spaced apart from each other at a predetermined distance Ds and installed in parallel with the end of the hand 110.

The first distance sensor 111 and second distance sensor 112 are electrically connected to a controller 140 to which are in turn connected a traverse sensor 120 for sensing the feeding of the glass panel 10, which is an object to be fed, and a position sensor 130 for sensing the position of a traveling axis of the feeding robot.

Also connected to the controller 140 are a feeding driver 150 for moving the feeding robot, a robot driver 160 for actuating the robot, and an encoder 170 for measuring movements of the respective components of the robot. A storage unit 180 is further connected to the controller 140 to store information regarding the position of the feeding robot and control logic for the robot.

On the other hand, the hand of the feeding robot may be of a fixed or movable type. A detailed description will first be made of the operation of the feeding robot with the above-stated construction in accordance with the present invention under the condition that the robot hand is of the fixed type.

Figure 4:
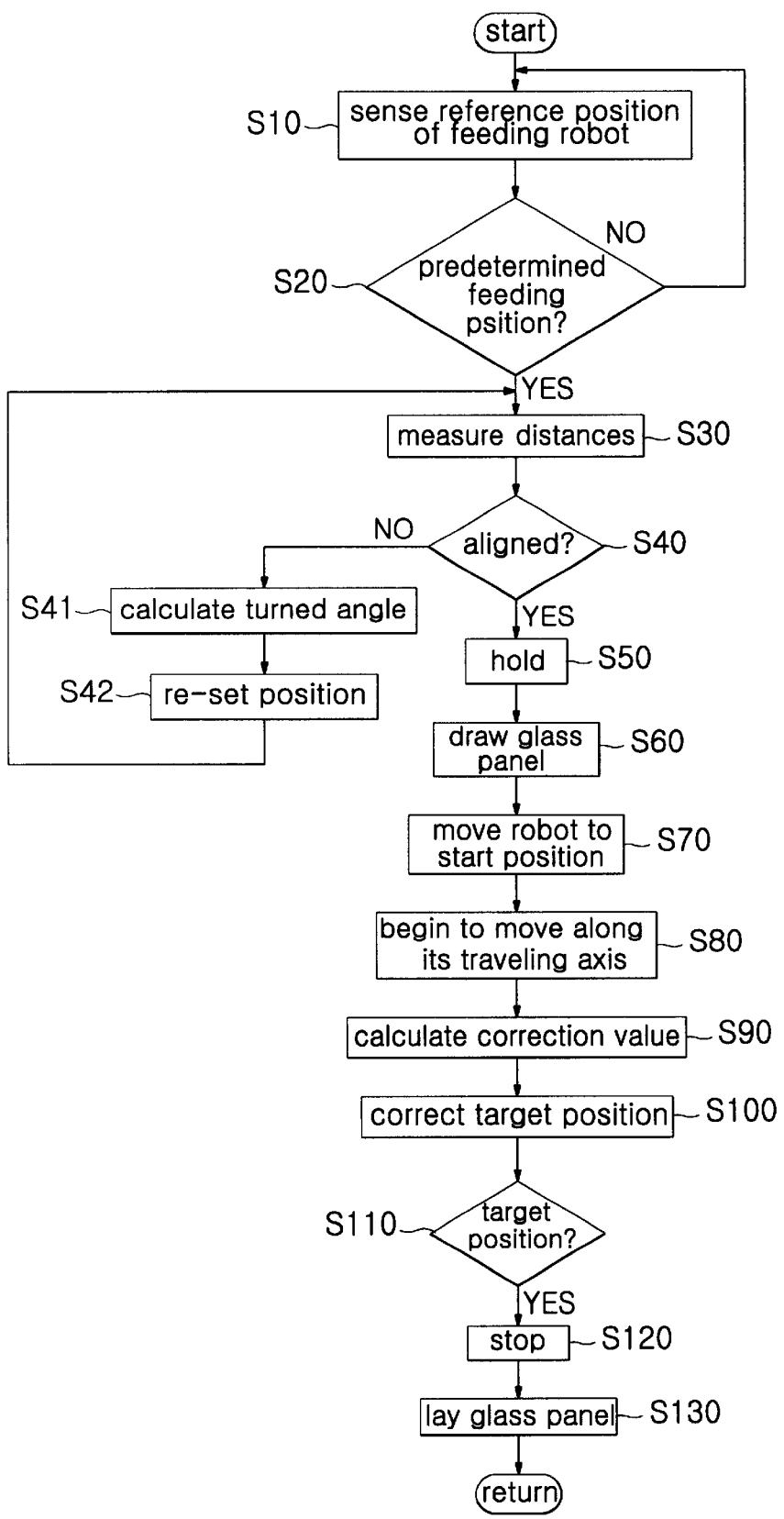
FIG. 4 is a flowchart illustrating a method for controlling the feeding robot in accordance with a preferred embodiment of the present invention.

FIG. 4 is a flowchart illustrating a method for controlling the feeding robot in accordance with a preferred embodiment of the present invention, and FIGS. 5a to 5e are plan views illustrating the operation of the feeding robot, based on the control method of FIG. 4.

If the feeding robot moves to feed the glass panel 10, then the controller 140 senses the position of the robot through the position sensor 130 (S10) and determines from the sensed result whether the body 100 of the robot has arrived at a predetermined feeding position (S20).

Upon determining at the above step S20 that the feeding robot body 100 has arrived at the predetermined feeding position, the controller 140 controls the feeding driver 150 to stop the robot. At this time, the position of the feeding robot body 100 is a start position Q whose value is stored in the storage unit 180 by the controller 140. Then, the controller 140 measures distances R1 and R2 between the position of the feeding robot body 100 and the glass panel 10 respectively through the first distance sensor 111 and second distance sensor 112 provided on the hand 110 (S30)(see FIG. 5a).

Figure 5A:
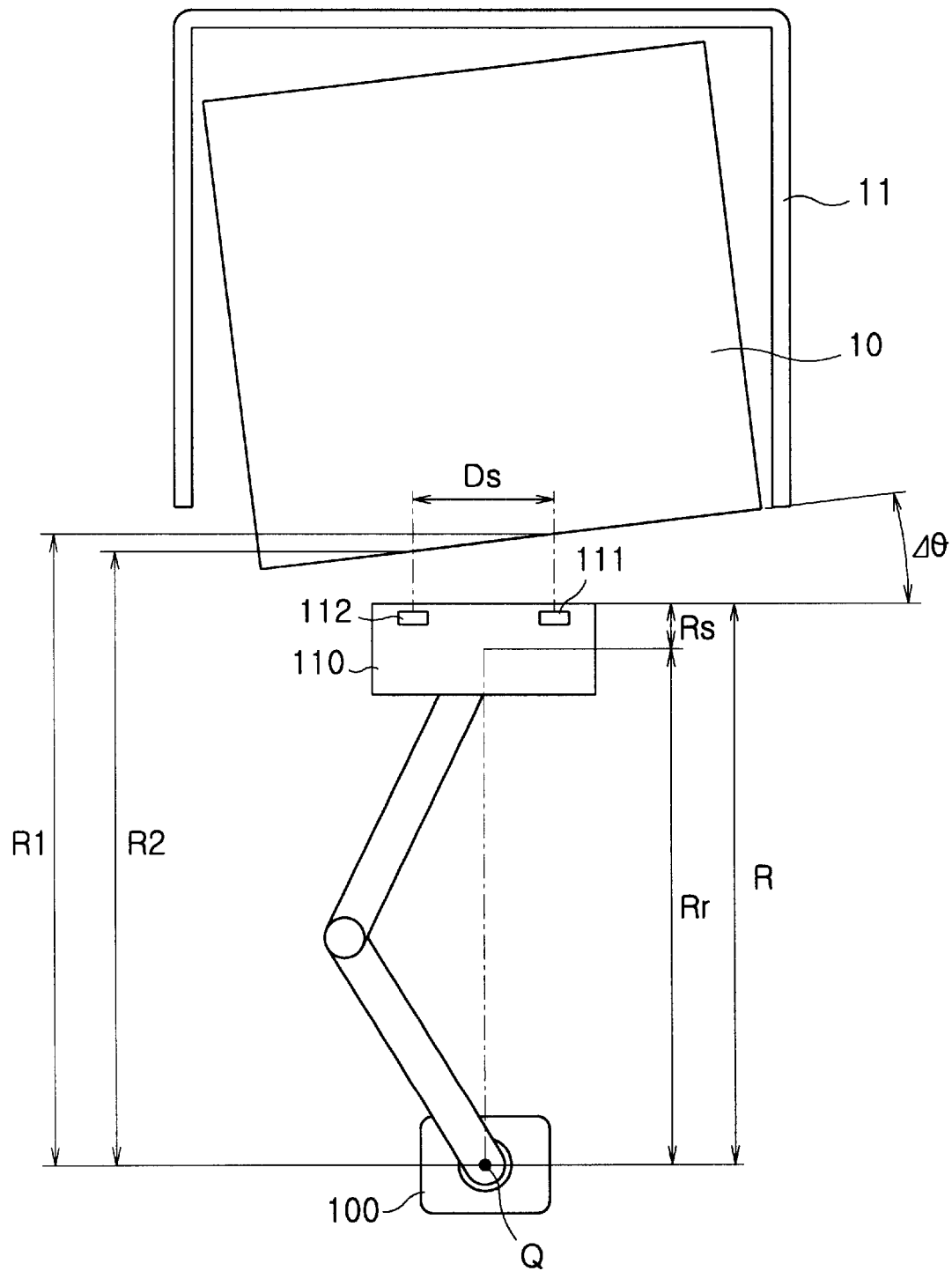

With reference to FIG. 5a, Rr is a distance from the position of the feeding robot body to the center of the hand, Rs is a distance from the hand center to the end of the hand, R1 is a distance from the position of the feeding robot body to the glass panel 10, measured through the first distance sensor 111 on the hand (i.e., the sum of a distance actually measured by the first distance sensor and a distance R), R2 is a distance from the position of the feeding robot body to the glass panel 10, measured through the second distance sensor 112 on the hand (i.e., the sum of a distance actually measured by the second distance sensor and the distance R), and R is a distance from the position of the feeding robot body 100 to the hand end (i.e., the sum of Rs and Rr).

The controller 140 determines whether the glass panel 10 has been accurately aligned with the traveling axis of the feeding robot, or the hand 110 of the robot (S40). For this alignment determination, the controller 140 determines whether the distance R1 from the position of the feeding robot body to the glass panel 10, measured through the first distance sensor 111, is equal to the distance R2 from the position of the feeding robot body to the glass panel 10, measured through the second distance sensor 112.

If it is determined at the above step S40 that the distances R1 and R2 are not equal, the controller 140 recognizes that the glass panel 10 has not been accurately aligned with the hand 110 of the feeding robot and then calculates an angle $\Delta\theta$ at which the glass panel 10 is turned relative to the traveling axis of the robot, or its correct position, on the basis of the below equation 1 (S41):

$$\tan\Delta\theta = \frac{R1 - R2}{Ds} \qquad \text{[Equation 1]}$$

where, Ds is a distance between the first distance sensor and the second distance sensor.

After calculating the turned angle of the glass panel 10 at the above step S41, the controller 140 calculates the position R' of the hand on the basis of the following equation 2 and in turn a movement $\Delta T$ of the traveling axis of the feeding robot on the basis of the below equation 3:

$$R' = \frac{R1 + R2}{2\cos\Delta\theta} \qquad \text{[Equation 2]}$$

$$\Delta T = R'\sin\Delta\theta \qquad \text{[Equation 3]}$$

Figure 5B:
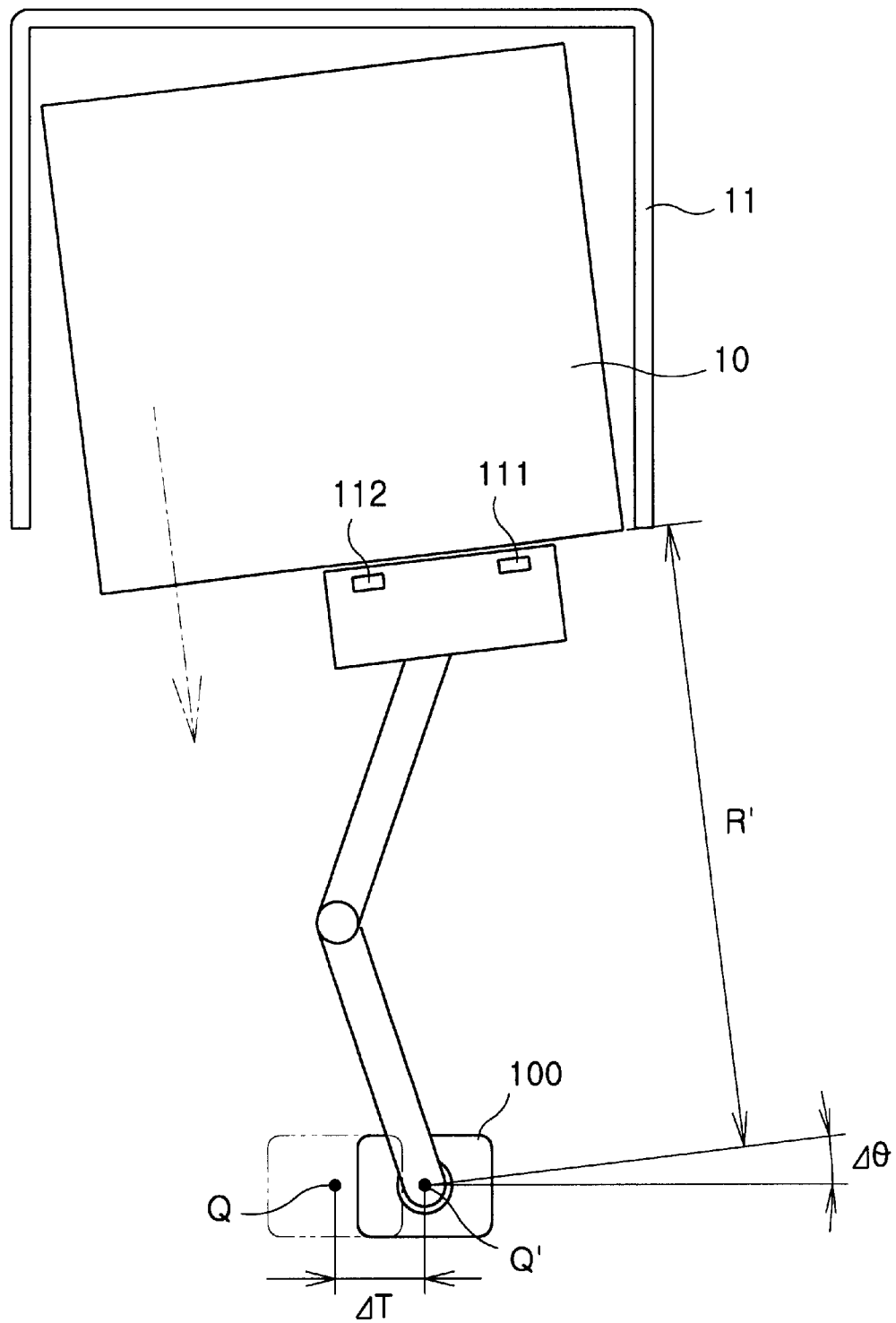
Figure 5C:
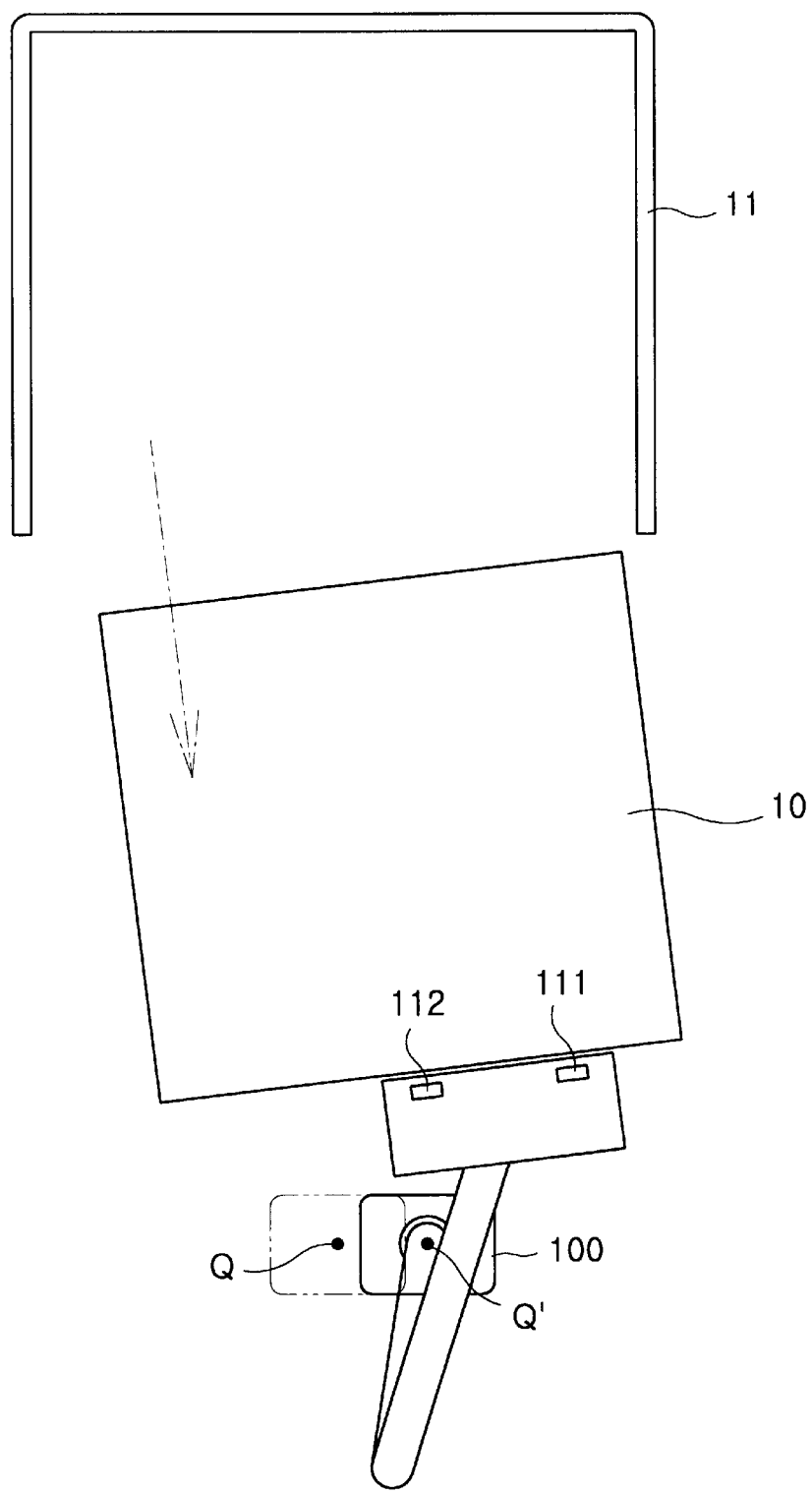

The controller 140 accurately aligns the hand 110 and the glass panel 10 on the basis of the results obtained from the above equations 1, 2 and 3 (S42) (see FIG. 5b). As a result, the body 100 of the feeding robot moves from the position Q to a position Q' by $\Delta T$.

After the hand 100 and the glass panel 10 are accurately aligned with each other, the controller 140 measures the distances R1 and R2 between the position of the feeding robot body 100 and the glass panel 10 respectively through the first distance sensor 111 and second distance sensor 112 to check the aligned state of the hand 100 and glass panel 10 (S30). The controller 140 then determines whether the glass panel 10 has been accurately aligned with the traveling axis of the feeding robot, or the hand 110 of the robot (S40). For this alignment determination, the controller 140 determines whether the distance R1 from the position of the feeding robot body to the glass panel 10, measured through the first distance sensor 111, is equal to the distance R2 from the position of the feeding robot body to the glass panel 10, measured through the second distance sensor 112.

Upon determining at the above step S40 that the distances R1 and R2 are equal, the controller 140 recognizes that the glass panel 10 has been accurately aligned with the hand 110 of the feeding robot and then controls the robot driver 160 such that the hand 110 holds the glass panel 10 (S50). The controller 140 then controls the robot driver 160 to draw the glass panel 10 from a cassette 11 in the same direction as the axis of the panel 10 (S60)(see FIG. 5c).

Figure 5D:
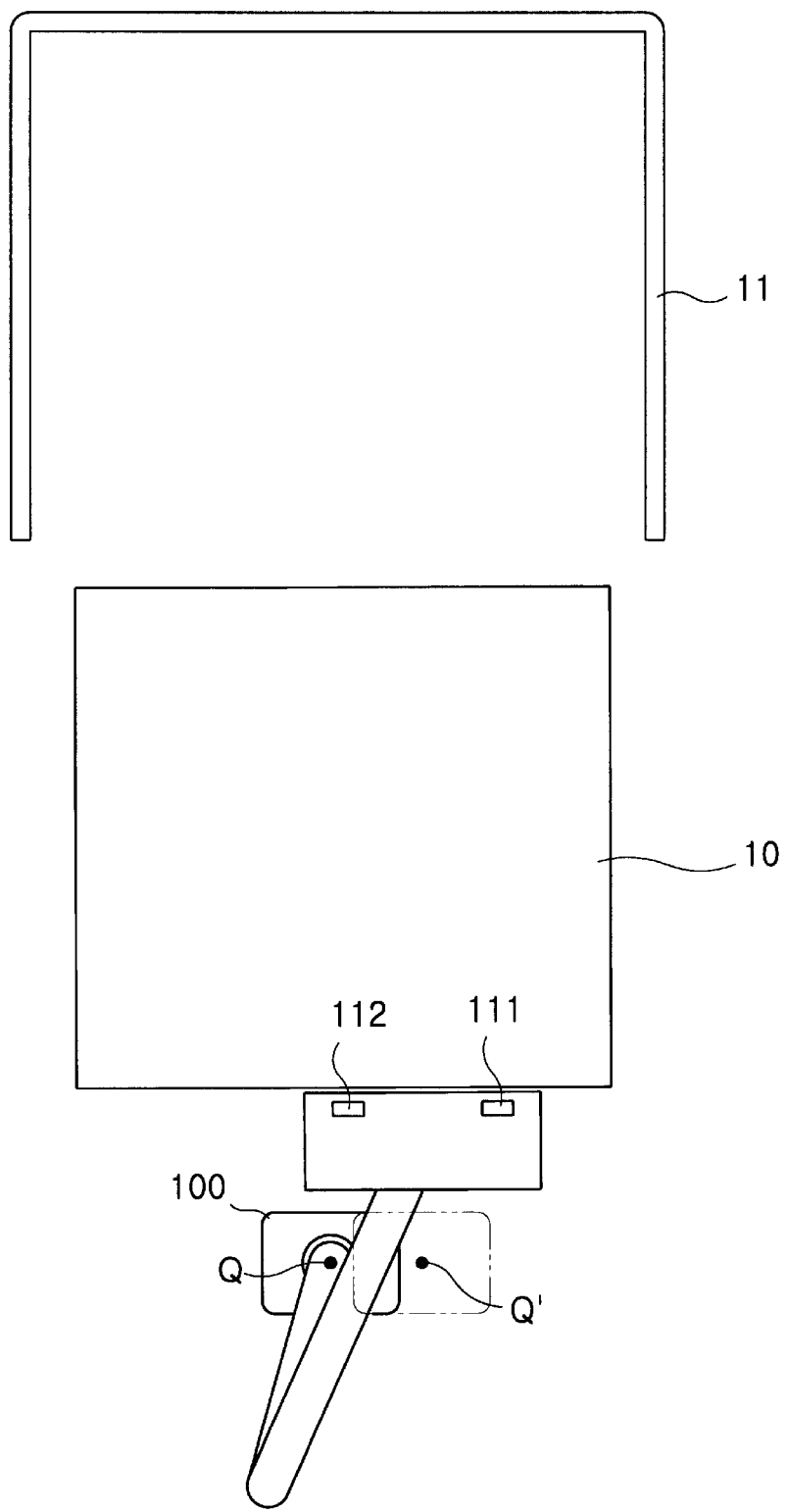

After drawing the glass panel 10, the controller 140 reads the value of the start position Q from the storage unit 180 and then controls the feeding driver 150 according to the read value to move the feeding robot to the start position Q (S70)(see FIG. 5d). The controller 140 also controls the robot driver 160 such that the hand 110 is in parallel with the traveling axis of the feeding robot when the robot moves to the start position.

After moving to the start position, the feeding robot begins to move along its traveling axis under the control of the controller 140 (S80). If the feeding robot begins to move, the controller 140 calculates a target position correction value $\Delta D$ through the traverse sensor 120 (S90). For calculation of the correction value, the controller 140 calculates a movement distance D' of the glass panel on the basis of information sensed by the traverse sensor 120 and position sensor 130 and in turn the correction value $\Delta D$ on the basis of the calculated movement distance D' as in the below equation 4 (see FIG. 5e).

$$\Delta D = D' - D \qquad \text{[Equation 4]}$$

where, D'=current movement start position of glass panel—position of glass panel intersecting traverse sensor, and D=predetermined movement start position of glass panel—position of glass panel intersecting traverse sensor.

The controller 140 corrects a target position S on the basis of the calculated correction value $\Delta D$ (S+$\Delta D$)(S100). The controller 140 then determines whether the feeding robot has arrived at the corrected target position S+$\Delta D$ (S110). Upon determining at step S110 that the feeding robot has arrived at the corrected target position, the controller 140 controls the feeding driver 150 to stop the feeding robot (S120). Thereafter, the controller 140 controls the robot driver 160 to lay the glass panel 10 on an outlet stage (S130).

Next, a detailed description will be given of the operation of the feeding robot in accordance with the present invention under the condition that the robot hand is of the movable type.

Figure 6:
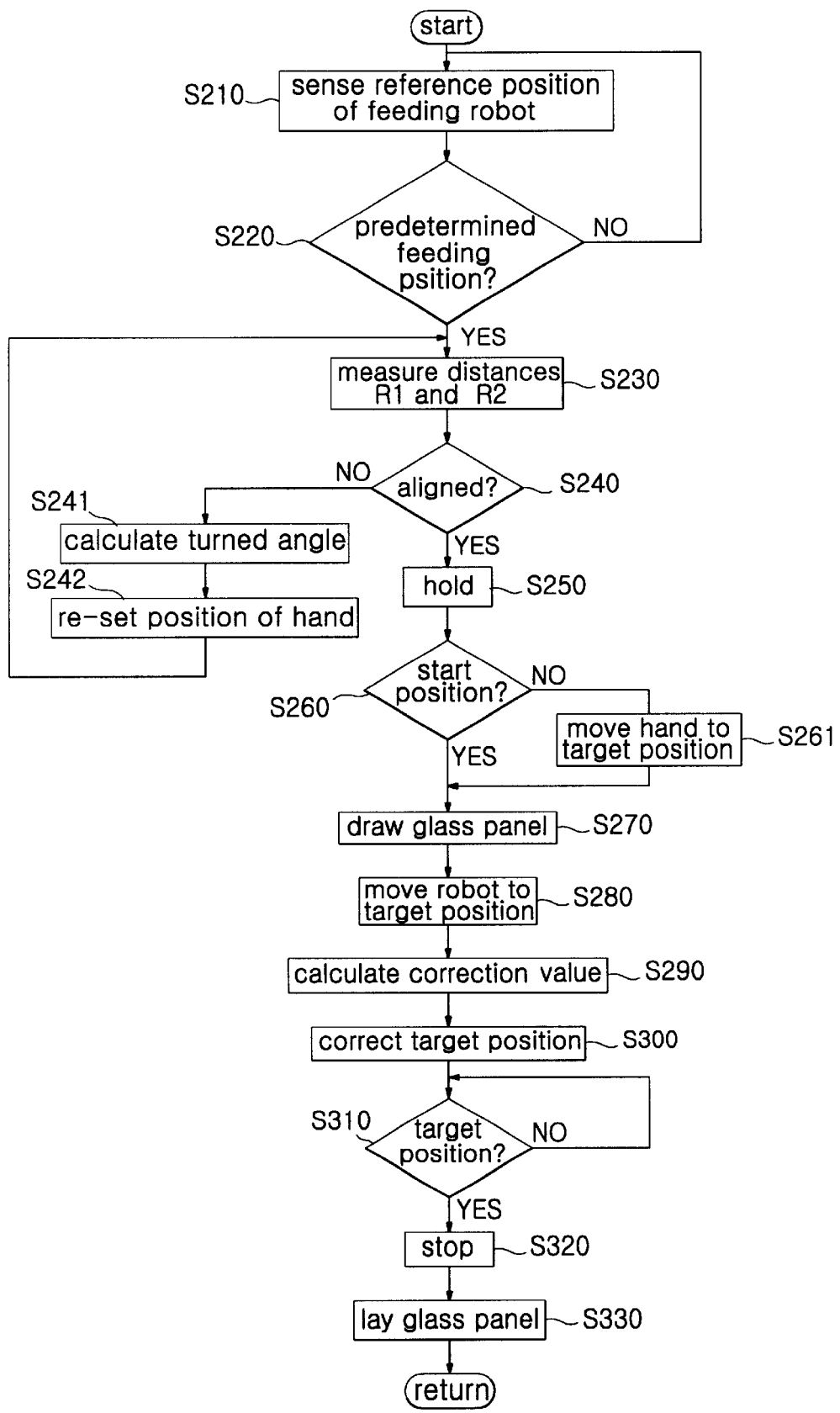
FIG. 6 is a flowchart illustrating a method for controlling the feeding robot in accordance with an alternative embodiment of the present invention.

FIG. 6 is a flowchart illustrating a method for controlling the feeding robot in accordance with an alternative embodiment of the present invention, and FIGS. 7a to 7e are plan views illustrating the operation of the feeding robot, based on the control method of FIG. 6.

If the feeding robot body 100 moves to feed the glass panel 10, then the controller 140 senses the position of the robot body through the position sensor 130 (S210) and determines from the sensed result whether the robot body 100 has arrived at a predetermined feeding position (S220).

If it is determined at the above step S220 that the feeding robot body 100 has arrived at the predetermined feeding position, the controller 140 controls the feeding driver 150 to stop the robot body. At this time, the position of the feeding robot body 100 is a start position Q1 whose value is stored in the storage unit 180 by the controller 140 together with a position value Q2 of the hand 110. Then, the controller 140 measures distances R1 and R2 between the position of the feeding robot body 100 and the glass panel 10 respectively through the first distance sensor 111 and second distance sensor 112 provided on the hand 110 (S230)(see FIG. 7a).

Figure 7A:
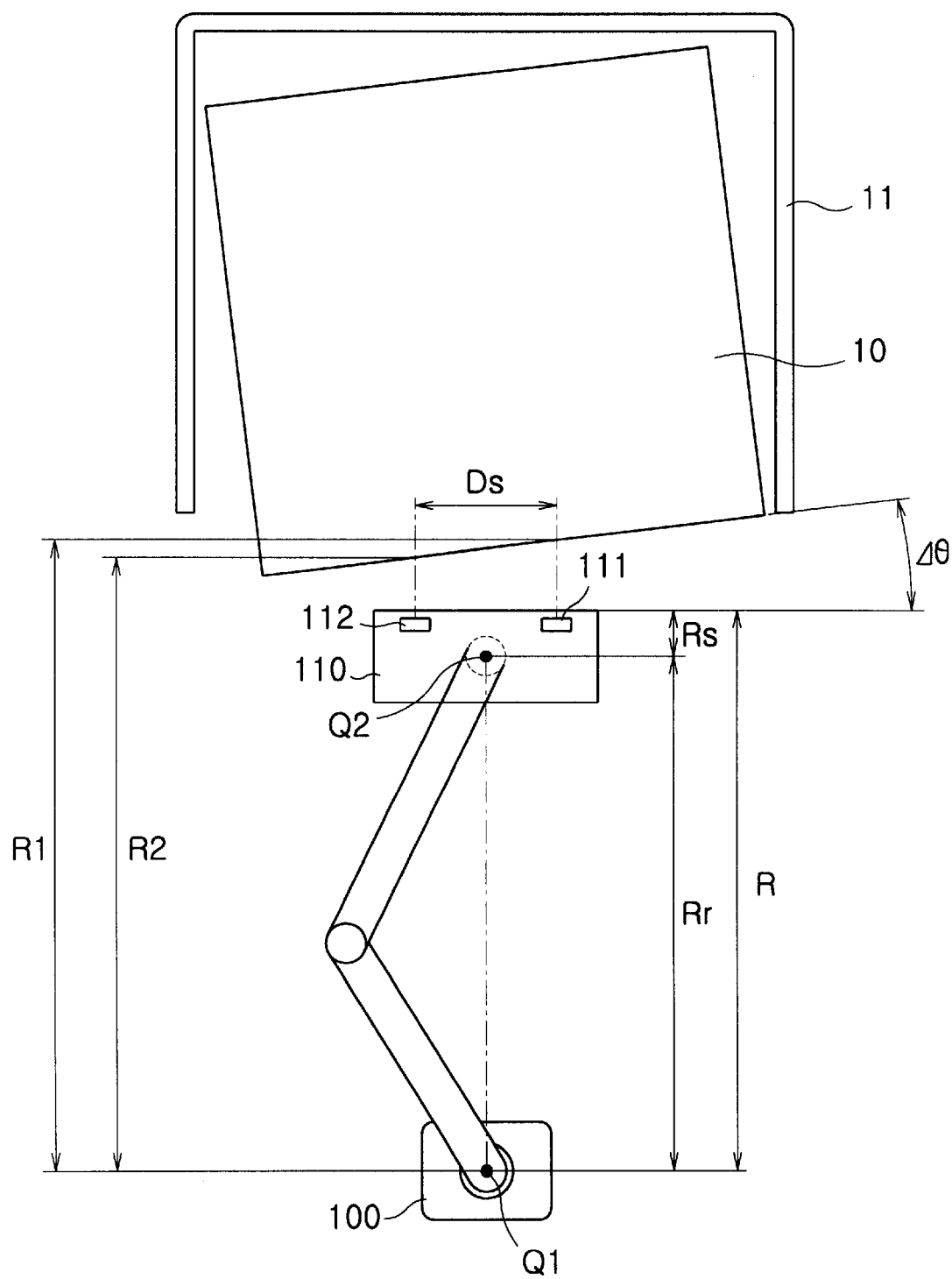
FIGS. 7a to 7e are plan views illustrating the operation of the feeding robot, based on the control method of FIG. 6.

With reference to FIG. 7a, Rr is a distance from the position of the feeding robot body to the center of the hand, Rs is a distance from the hand center to the end of the hand, R1 is a distance from the position of the feeding robot body to the glass panel 10, measured through the first distance sensor 111 on the hand (i.e., the sum of a distance actually measured by the first distance sensor and a distance R), R2 is a distance from the position of the feeding robot body to the glass panel 10, measured through the second distance sensor 112 on the hand (i.e., the sum of a distance actually measured by the second distance sensor and the distance R), and R is a distance from the position of the feeding robot body 100 to the hand end (i.e., the sum of Rs and Rr).

The controller 140 determines whether the glass panel 10 has been accurately aligned with the traveling axis of the feeding robot, or the hand 110 of the robot (S240). For this alignment determination, the controller 140 determines whether the distance R1 from the position of the feeding robot body to the glass panel 10, measured through the first distance sensor 111, is equal to the distance R2 from the position of the feeding robot body to the glass panel 10, measured through the second distance sensor 112.

Upon determining at the above step S240 that the distances R1 and R2 are not equal, the controller 140 recognizes that the glass panel 10 has not been accurately aligned with the hand 110 of the feeding robot and then calculates an angle $\Delta\theta$ at which the glass panel 10 is turned relative to the traveling axis of the robot, or its correct position, on the basis of the below equation 5 (S241):

$$\tan\Delta\theta = \frac{R1 - R2}{Ds} \qquad \text{[Equation 5]}$$

where, Ds is a distance between the first distance sensor and the second distance sensor.

Figure 7B:
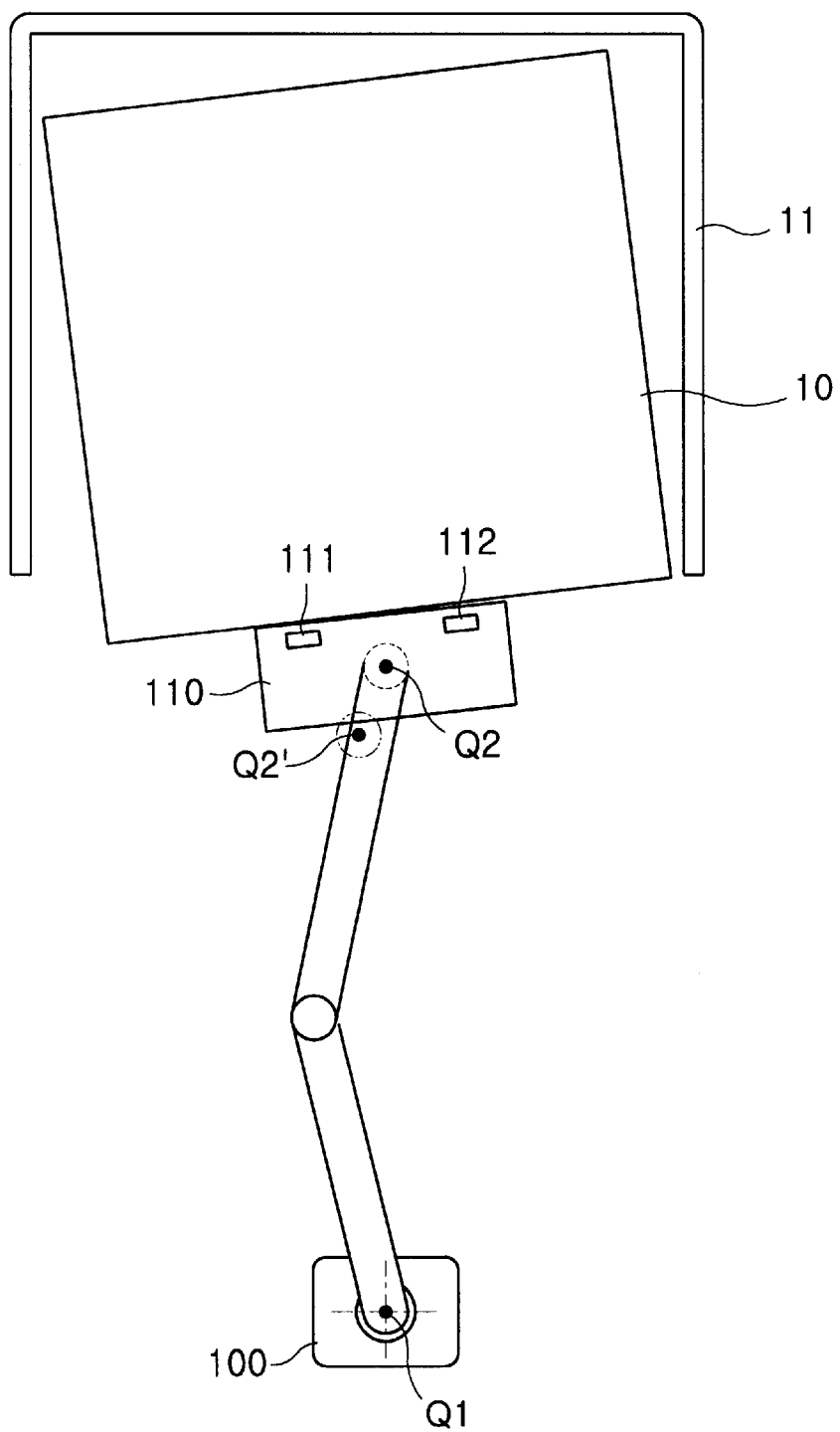
Figure 7C:
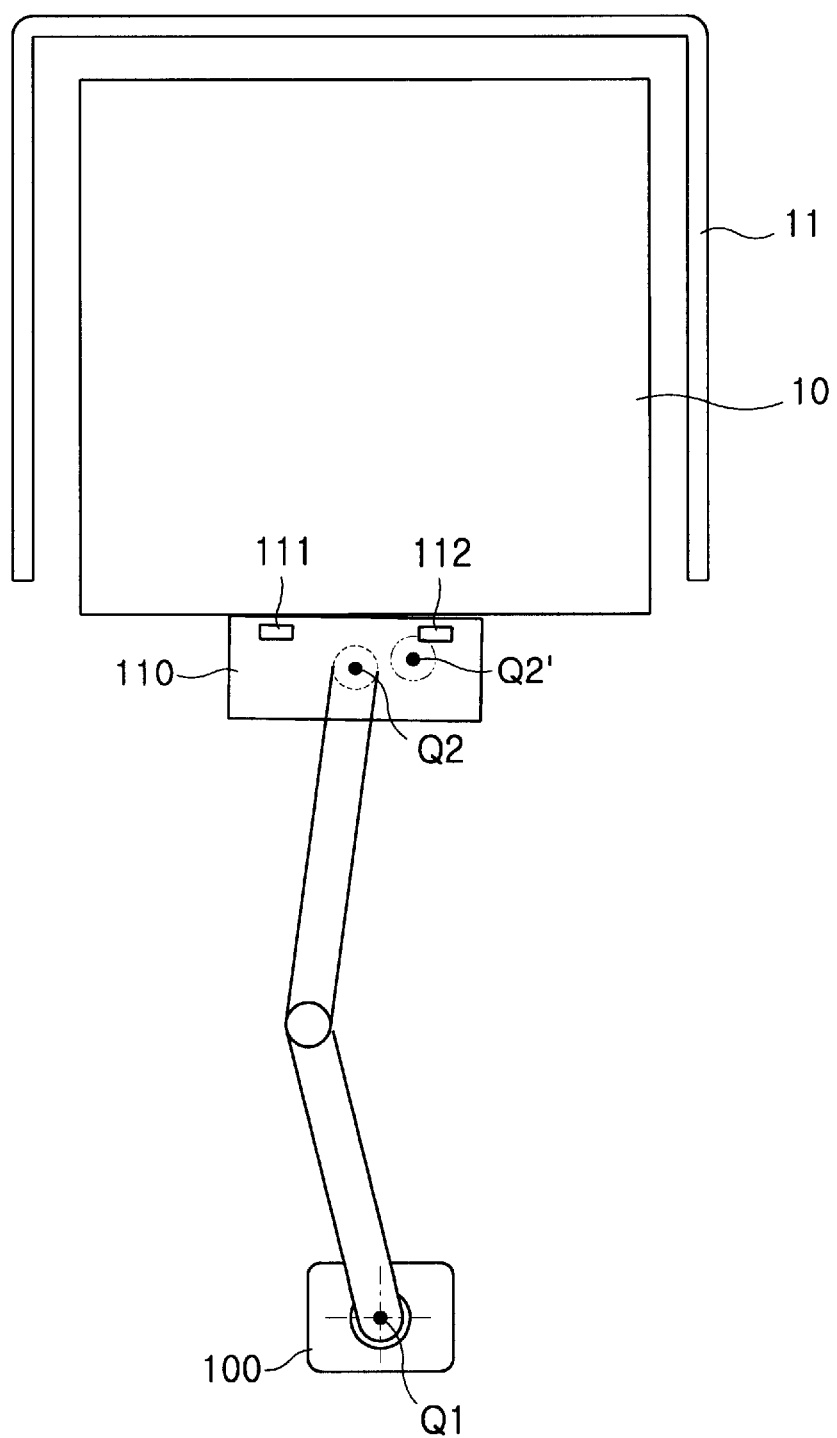
Figure 7D:
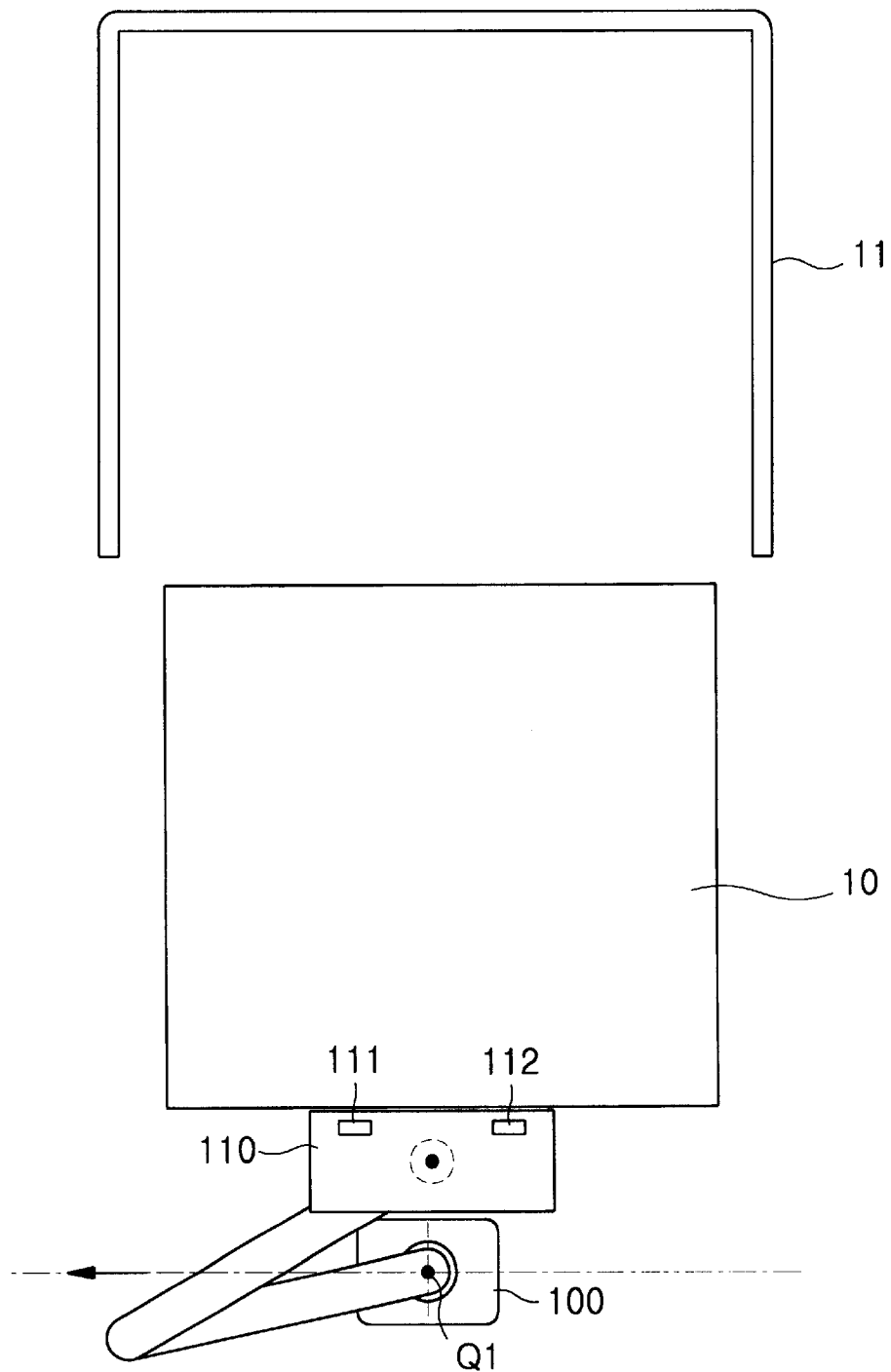
Figure 7E:
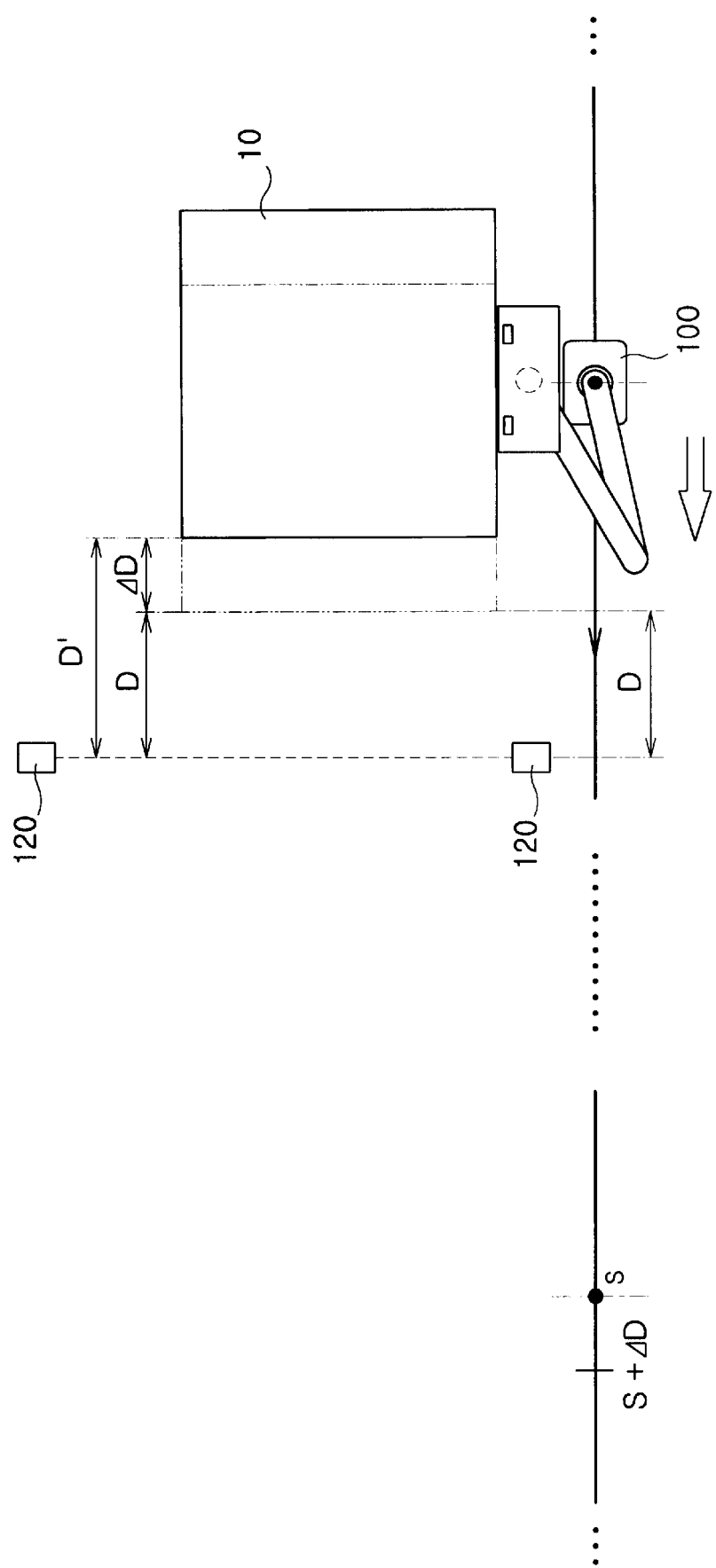

After calculating the turned angle of the glass panel 10, the controller 140 controls the robot driver 160 to turn the hand 110 by the turned angle under the condition that the feeding robot body 100 is in a stationary state (i.e., fixed at the start position Q1), so as to re-set the position of the hand 110 to Q2' (S242)(see FIG. 7b). Thereafter, the controller 140 measures the distances R1 and R2 between the position of the feeding robot body 100 and the glass panel respectively through the first distance sensor 111 and second distance sensor 112 to check the aligned state of the hand 100 and glass panel 10 (S230).

The controller 140 then determines whether the glass panel 10 has been accurately aligned with the traveling axis of the feeding robot, or the hand 110 of the robot (S240). For this alignment determination, the controller 140 determines whether the distance R1 from the position of the feeding robot body to the glass panel 10, measured through the first distance sensor 111, is equal to the distance R2 from the position of the feeding robot body to the glass panel 10, measured through the second distance sensor 112.

Upon determining at the above step S240 that the distances R1 and R2 are equal, the controller 140 recognizes that the glass panel 10 has been accurately aligned with the hand 110 of the feeding robot and then controls the robot driver 160 such that the hand 110 holds the glass panel 10 (S250).

The controller 140 then compares the current position Q2' of the feeding robot hand 110 with the start position Q2 thereof to determine whether the hand 110 is present at the start position Q2 (S260). If it is determined at step S260 that the current position Q2' of the hand 110 is not the same as the start position Q2 thereof, the controller 140 recognizes that the hand 110 remains turned at the above turned angle and then controls the robot driver 160 to move the hand 110 to the start position Q2 (S261)(see FIG. 7c).

At this time, only the hand 110 moves under the condition that the feeding robot body does not move. The glass panel 10 is aligned with the traveling axis of the feeding robot as the hand 110 of the robot moves from the position Q2' to the position Q2. If the hand 110 of the feeding robot returns to the original position Q2, then the controller 140 controls the robot driver 160 to draw the glass panel 10 from the cassette 11 (S270)(see FIG. 7d).

After drawing the glass panel 10, the controller 140 controls the feeding driver 150 to move the feeding robot to a preselected target position S (S280). If the feeding robot begins to move to the target position S, then the controller 140 calculates a correction value $\Delta D$ for the target position through the traverse sensor 120 (S290). For calculation of the correction value, the controller 140 calculates a movement distance D' of the glass panel on the basis of information sensed by the traverse sensor 120 and position sensor 130 and in turn the correction value $\Delta D$ on the basis of the calculated movement distance D' as in the below equation 6 (see FIG. 7e).

$$\Delta D = D' - D \qquad \text{[Equation 6]}$$

where, D'=current movement start position of glass panel—position of glass panel intersecting traverse sensor, and D=predetermined movement start position of glass panel—position of glass panel intersecting traverse sensor.

The controller 140 corrects the target position S on the basis of the calculated correction value $\Delta D$ (S+$\Delta D$)(S300). The controller 140 then determines whether the feeding robot has arrived at the corrected target position S+$\Delta D$ (S310). Upon determining at step S310 that the feeding robot has arrived at the corrected target position, the controller 140 controls the feeding driver 150 to stop the feeding robot (S320). Subsequently, the controller 140 controls the robot driver 160 to lay the glass panel 10 on an outlet stage (S330).

As apparent from the above description, the present invention provides a feeding robot control method for aligning an LCD glass panel with a hand of a feeding robot using sensors in the robot. The feeding robot is able to draw an LCD glass panel from a cassette safely without bringing it into collision with the cassette and to lay the drawn LCD glass panel on an outlet stage with a high degree of positional precision.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A feeding robot having a body, a plurality of joints, a plurality of links, each for interconnecting corresponding ones of said joints, and a hand holding an object to be fed, said robot comprising:

distance sensing means for measuring a distance between said hand and said object, said distance sensing means including a first distance sensor and a second distance sensor, said first and second distance sensors being arranged on said hand in such a manner that said first and second distance sensors have a bilateral symmetry on the basis of the center of the end of said hand and are space apart from each other at a predetermined distance.

2. The robot as set forth in claim 1, wherein each of said first and second distance sensors is any one of an optical sensor or ultrasonic sensor.

3. The robot as set forth in claim 1, wherein said traverse sensing means is installed at a predetermined position on a traveling path of said object to said target position.

4. The robot as set forth in claim 1, wherein said controller is adapted to determine from values measured by said distance sensing means whether said object has been accurately aligned with said hand and to correct said target position on the basis of said information sensed by said traverse sensing means.

5. A method for controlling a feeding robot, comprising the steps of:

a) determining whether an object to be fed has been accurately aligned with a traveling axis of said feeding robot;

b) calculating a turned angle of said object relative to said traveling axis if said object has not been accurately aligned with said traveling axis;

c) turning said robot by said turned angle and then drawing said object;

d) moving said robot to a target position and calculating a correction value for the target position; and e) correcting said target position by the calculated correction value.

6. The method as set forth in claim 5, wherein said alignment determination step a) includes the step of calculating distances between said object and a hand of said feeding robot through a plurality of distance sensors provided on said hand, determining that said object has been accurately aligned with said traveling axis of said feeding robot, if the calculated distances are equal, and determining that said object has not been accurately aligned with said traveling axis of said feeding robot, if the calculated distances are not equal.

7. The method as set forth in claim 6, wherein said turned angle calculation step b) includes the step of calculating said turned angle of said object relative to said traveling axis of said feeding robot on the basis of a predetermined distance between said distance sensors and a difference between said distances calculated through said distance sensors as in the following equation:

$$\tan\Delta\theta = \frac{\text{difference between calculated distances}}{\text{distance between distance sensors}}$$

where $\Delta\theta$ is said turned angle.

8. The method as set forth in claim 5, wherein said turned angle calculation step b) includes the step of calculating said turned angle of said object relative to said traveling axis of said feeding robot on the basis of a predetermined distance between said distance sensors and a difference between said distances calculated through said distance sensors as in the following equation:

$$\tan\Delta\theta = \frac{\text{difference between calculated distances}}{\text{distance between distance sensors}}$$

where $\Delta\theta$ is said turned angle.

9. The method as set forth in claim 5, wherein said drawing step c) includes the steps of:

c-1) turning a hand of said robot by said turned angle to align said object with said hand;

c-2) holding said object by said hand and returning it to a start position; and c-3) drawing said object in the same direction as the axis of said object.

10. The method as set forth in claim 5, wherein said drawing step c) includes the steps of:

c-1) turning a body of said robot by said turned angle to align said object with a hand of said robot;

c-2) drawing said object in the same direction as the axis of said object; and c-3) setting said hand in parallel with said traveling axis of said robot.

11. The method as set forth in claim 5, wherein said correction value calculation step d) includes the steps of:

d-1) calculating a position value on the basis of a time period for which said object passes through a predetermined position as it is fed from a start position to said target position; and d-2) calculating said correction value from a difference between the calculated position value and a predetermined reference position value.

* * * * *

UNITED STATES PATENT AND TRADEMARK OFFICE
CERTIFICATE OF CORRECTION

PATENT NO. : 6,490,504 B2
DATED : December 3, 2002
INVENTOR(S) : Tae-Kyu Son

It is certified that error appears in the above-identified patent and that said Letters Patent is hereby corrected as shown below:

Title page,
Item [56], References Cited, U.S. PATENT DOCUMENTS, insert the following:

```
-- 5,015,832    05/1991      Filipski et al.
   5,538,385    07/1996      Bacchi et al.
   5,382,806    01/1995      Bacchi et al.
   5,646,776    07/1997      Bacchi et al.
   5,697,759    12/1997      Bacchi et al.
   5,765,444    06/1998      Bacchi et al.
   5,256,555    07/2001      Bacchi et al.
   6,275,748    08/2001      Bacchi et al.
   6,360,144    03/2002      Bacchi et al.
   3,666,830    05/1972      Alekna --
```

Insert:
-- FOREIGN PATENT DOCUMENTS
0 418 018 A2   03/1991        EPO --

Signed and Sealed this

Seventeenth Day of June, 2003

JAMES E. ROGAN
*Director of the United States Patent and Trademark Office*